United States Patent
Kunkle et al.

[11] 3,930,552
[45] Jan. 6, 1976

[54] MOTOR VEHICLE BATTERY HOLDER

[75] Inventors: Calvin S. Kunkle; Hugh A. Little, both of Tipton, Ind.

[73] Assignee: FMC Corporation, San Jose, Calif.

[22] Filed: Oct. 30, 1974

[21] Appl. No.: 519,395

[52] U.S. Cl. .................. 180/68.5; 105/50; 292/62; 312/320; 312/333
[51] Int. Cl.² ........................................ B60R 18/02
[58] Field of Search ......... 180/68.5, 65, 60; 105/51, 105/50; 312/281, 318, 320, 333, 348, 350; 292/62

[56] References Cited
UNITED STATES PATENTS

| | | | |
|---|---|---|---|
| 1,091,583 | 3/1914 | MacGlashan | 105/51 |
| 1,209,962 | 12/1916 | Heath | 180/68.5 |
| 1,483,097 | 2/1924 | Kline | 292/62 |
| 1,843,691 | 2/1932 | Mancha et al. | 105/51 |
| 2,548,256 | 4/1951 | Deo | 180/68.5 |
| 2,609,268 | 9/1952 | Nye | 312/320 |
| 3,120,412 | 2/1964 | Caldwell | 312/333 X |

*Primary Examiner*—Leo Friaglia
*Assistant Examiner*—Milton L. Smith
*Attorney, Agent, or Firm*—J. F. Verhoeven; J. W. Edwards; C. E. Tripp

[57] ABSTRACT

A motor vehicle has an enclosed battery storage compartment with a door separating the compartment from an adjacent support surface that has been roughened to reduce slippage of persons stepping thereon. A battery holder has a mounting base in the compartment and a battery cell support tray mounted on wheels for rolling between a position on top of the mounting base, where the battery cells are housed, and a position on the surface, where the battery cells are inspected and serviced. Mounted to the tray is a handle having a horizontally extending grip portion for grasping to move the handle or tray and a vertical projecting lock portion for engaging a keeper, mounted on the mounting base, to lock the tray in a stationary position. When the handle is in a tray locking position, the grip portion of the handle extends adjacent the tray and the compartment door can be closed, retaining the handle in its locked position. When the door is opened and the handle unlocked, the grip portion of the handle extends outwardly from the tray for moving the tray. Stops limit the outward movement of the tray from the compartment onto the adjacent support surface and guides are provided to restrain tray movement laterally of the normal direction of movement between the compartment and the support surface. Wheel retainers are provided to limit upward movement of the tray above the base.

12 Claims, 7 Drawing Figures

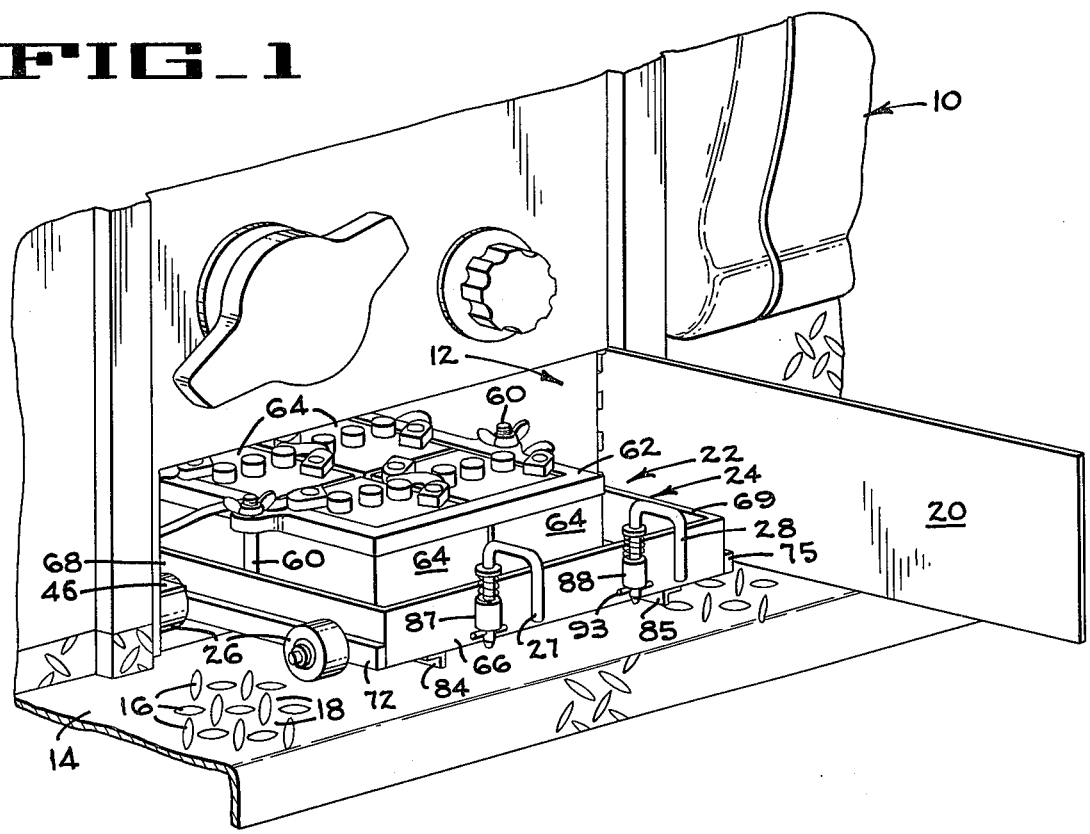
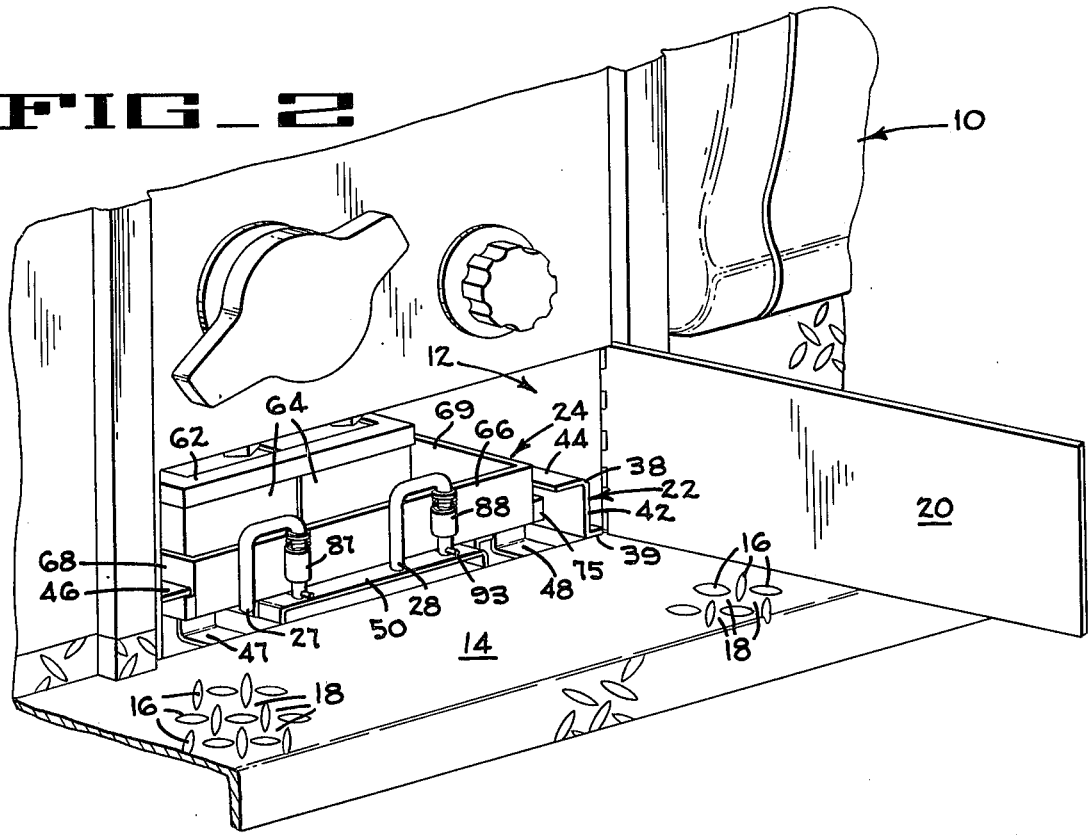

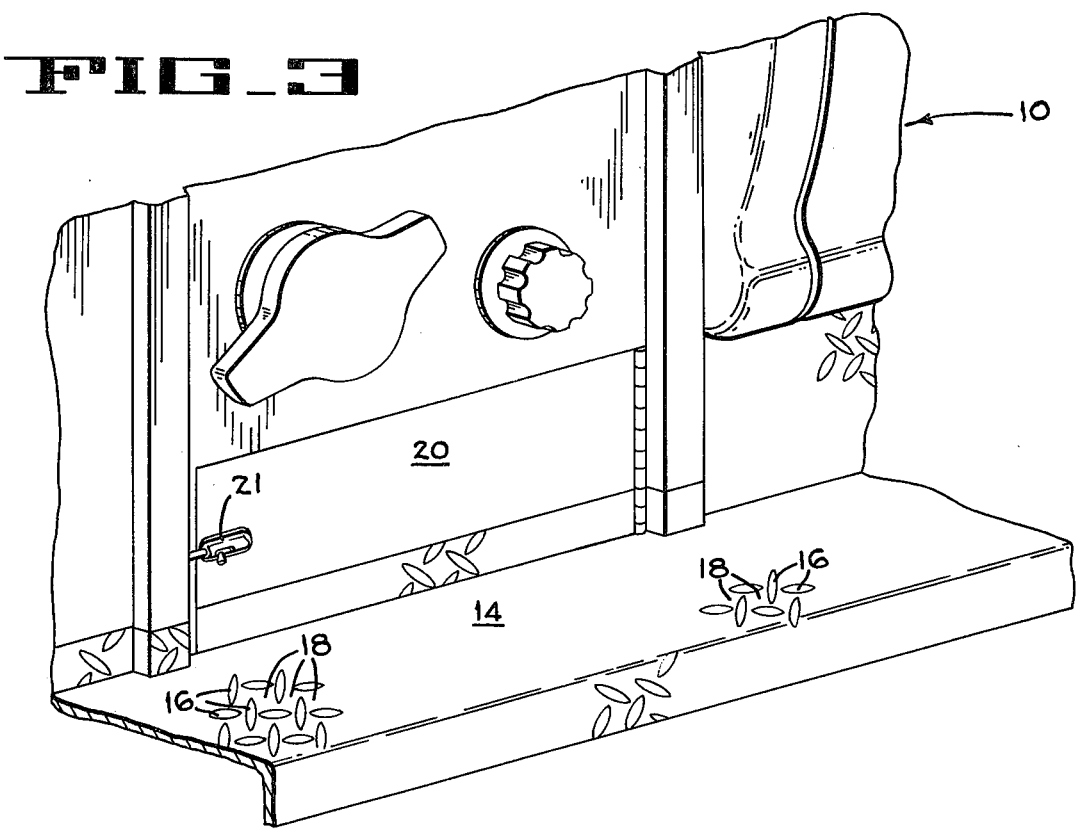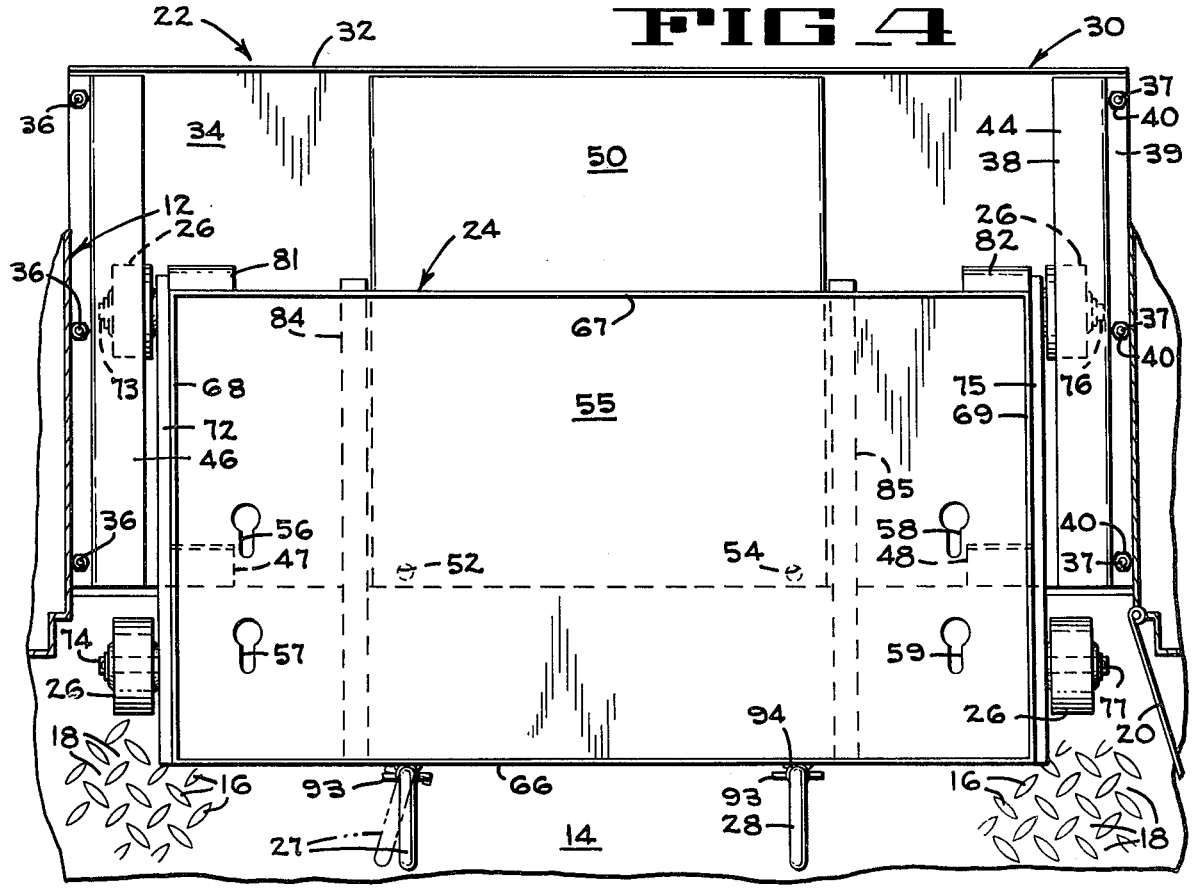

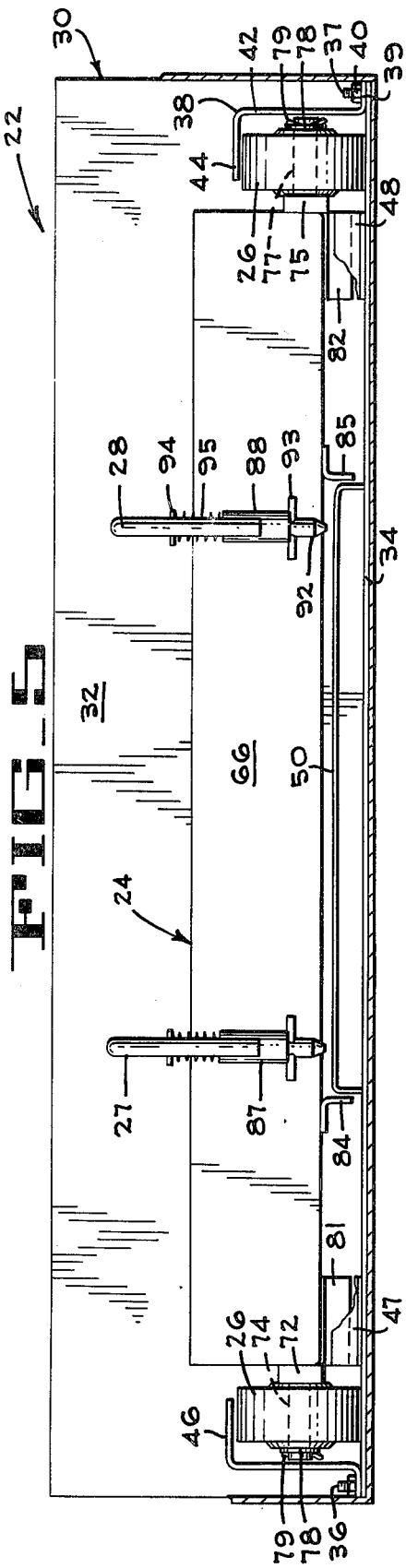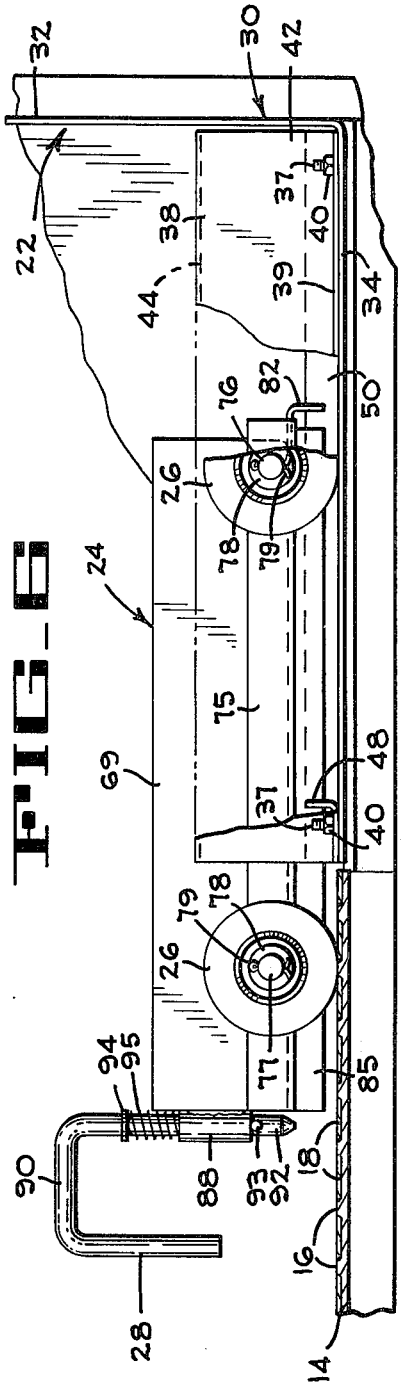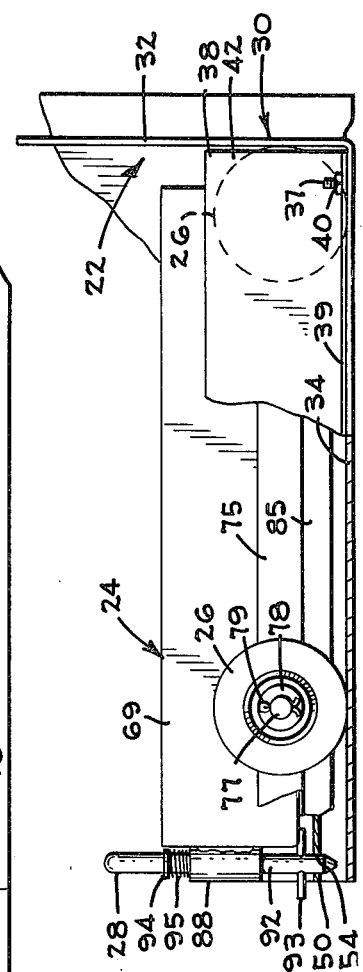

MOTOR VEHICLE BATTERY HOLDER

BACKGROUND OF THE INVENTION

1. Field of the Invention

This invention relates to motor vehicle battery mountings and holders. More specifically, the invention pertains to a battery holder that supports battery cells for housing in an enclosed battery storage compartment on a motor vehicle and for readily moving the battery cells between the compartment and an adjacent support surface for inspection and servicing.

2. Description of the Prior Art

Movable tray assemblies with extensible slides that include steel ball bearings for supporting the tray, in a manner similar to a drawer of an office file cabinet, have been used for supporting battery cells in motor vehicles, such as fire trucks. A problem with such extensible slides has been that dirt or other foreign matter lodges in the ball bearing guides and makes the tray extremely difficult to move. Commercially available slide components are expensive and not particularly suitable for applications such as supporting battery trays because they are adversely affected by water, dirt, battery acids, and other foreign material.

Movable battery tray assemblies with extensible slides have included a small diameter roller assembly which supports the outer end of a battery tray upon an adjacent support surface when the battery tray is withdrawn from the battery storage compartment. Since the running boards of fire trucks have a roughened surface with a tread pattern to reduce the tendency for slipping of persons stepping thereon, it is difficult to move the small diameter roller assembly across the roughened surface of the running board because the roller drops into the valleys between the tread ridges. Thus, the outer end of the battery tray must be lifted upward until the roller is out of engagement with the tread ridges before the battery tray can be moved inward or outward by the extensible slides.

When extensible slides have been used, the door of the battery compartment has been attached to the tray like a door is attached to a file cabinet drawer. The heavy load of the batteries tends to bend the tray and the slides. Such bending results in misalignment of the door and prevents proper closure of the door within the door frame of the battery storage compartment.

Stationary battery holders have been mounted within the engine compartment of a motor vehicle but in such locations, the batteries are not readily accessible for inspection and servicing. Furthermore, it has been found that sometimes there is insufficient space within the engine compartment for the batteries. This is particularly true in the case of fire engines where a dual battery system is desired with auxiliary battery cells to insure against starting failures. Stationary battery holders have also been mounted upon the running boards of motor vehicles and provided with removable covers but it is often desirable to conserve such running board space for other purposes.

Problems encountered with known battery holders include the battery holder occupying space needed for other purposes; the battery cells are not readily accessible for inspection and servicing; the battery tray is difficult to move between a battery storage position and a battery inspection position; anti-friction devices enabling movement of the battery tray are adversely affected by water, battery acids, dirt and other foreign material; the anti-friction devices do not operate properly upon a roughened support surface; suitable anti-friction components are expensive; the battery tray can move in an undesired manner; and the storage compartment door does not close properly.

SUMMARY OF THE INVENTION

Space on a motor vehicle, having a battery storage compartment and an adjacent support surface, is effectively utilized by a battery cell support tray mounted on wheels to roll with minimal frictional resistance between a position on a base within the compartment where the battery cells are housed and a position on an adjacent support surface where the battery cells are inspected and serviced. The tray can be locked in a stationary position on the base to prevent undesired movement of the tray.

In a preferred form of the invention, a handle, for both locking and moving the tray, has a lock portion that engages a stationary keeper within the battery compartment to prevent undesired tray movement and a grip portion that extends adjacent the tray when locked but extends outwardly from the tray when unlocked for grasping and moving the handle or tray. The compartment has a door that can be closed only when the grip portion of the handle extends adjacent the tray in a locked position. This prevents inadvertently closing the door without locking the tray in a stationary position on the base and it also prevents an accidental unlocking of the tray by bouncing within the compartment with the door closed. The wheels have a diameter and a width large enough to roll on top of ridges without dropping into intermediate valleys in a tread pattern on the support surface adjacent the battery storage compartment. Guides are provided to restrain the tray from moving laterally of the direction of movement between the compartment and the support surface and stops are provided to limit the outward movement of the tray onto the support surface. Wheel retainers restrain upward movement of the tray from the base to prevent overriding the stops or unlocking the tray.

BRIEF DESCRIPTION OF THE DRAWING

FIG. 1 is a perspective view of a portion of a motor vehicle having a battery storage compartment located adjacent a support surface and a battery cell support tray mounted on wheels to roll between the compartment and the support surface. The tray is shown in a position extending outwardly from the compartment onto the support surface.

FIG. 2 is a perspective view similar to FIG. 1 but with the battery cell support tray locked in a stationary position within the compartment.

FIG. 3 is a perspective view of a portion of a motor vehicle having a battery storage compartment, as shown in FIG. 2, but with the compartment door closed.

FIG. 4 is a plan view of the battery holder shown in FIG. 1.

FIG. 5 is a front elevation of the battery holder shown in FIG. 4.

FIG. 6 is a side elevation of the battery holder shown in FIG. 4.

FIG. 7 is a side elevation of the battery holder but with the battery cell support tray in a locked position on the mounting base.

DESCRIPTION OF THE PREFERRED EMBODIMENT

With reference to FIG. 1, a motor vehicle 10, such as a fire truck, has a battery storage compartment 12 located adjacent a support surface 14. The support surface is defined by a running board that has a typical diamond tread pattern of ridges 16 and intermediate valleys 18 to prevent the slipping of persons stepping thereon. A door 20, shown in an open position in FIG. 1, can be closed, as shown in FIG. 3, to separate the compartment from the support surface. A latch 21 is provided for locking the door in the closed position from the outside of the compartment.

A battery holder 22, mounted within the compartment 12, has a battery cell support tray 24 that is mounted on wheels 26 to roll between the support surface 14 and the compartment. A pair of handles 27 and 28 are mounted to the tray for both locking the tray in a stationary position within the compartment and moving the tray when unlocked between the compartment and the support surface.

Looking now at FIGS. 4, 5 and 6, the battery holder 22 has a mounting base 30 that includes a vertical back panel 32 and a horizontal bottom panel 34. Three stud bolts 36 are welded at equal spaces along one side of the bottom panel to project upwardly therefrom and three corresponding stud bolts 37 are welded along the opposite side of the bottom panel. A wheel retainer 38 has a horizontal bottom flange 39, as shown in FIG. 5, with holes therein to fit about the stud bolts 37 and the flange is fastened to the bottom panel by stop nuts 40 that are threadably fitted upon the stud bolts. A web 42 projects upward vertically from the bottom flange of the wheel retainer to support a top flange 44 that extends outward from the web over the wheels 26. Mounted to the opposite side of the bottom panel is a corresponding wheel retainer 46 that fits about stud bolts 36 and extends over the wheel 26 on the opposite side of the battery cell support tray 24. The wheel retainers limit movement of the wheels upward from the bottom panel of the base and thereby restrain upward movement of the tray.

A pair of stops 47 and 48, formed by angles, are welded to the bottom panel 34 of the mounting base 30 in positions near the wheel retainers 46 and 38, respectively. The stops are located at the bottom panel end that is opposite from the back panel 32 and adjacent the support surface 14. A guide 50, in the form of an inverted channel, is also welded to the bottom panel and extends along the central portion thereof from the back panel to the end of the bottom panel adjacent the support surface. A pair of holes 52 and 54, shown in FIG. 4, are provided in the guide for receiving the handles 27 and 28 and thus, the guide 50 serves as a keeper for the handles 27 and 28 when the tray is locked in a stationary position on the base, as shown in FIG. 7.

The battery cell support tray 24 has a rectangular bottom panel 55 with bayonet slots 56, 57, 58 and 59 located therein. The bayonet slots receive and retain connecting bolts 60, shown in FIG. 1, that are attached to a hold-down frame 62, positioned about the perimeter of a group of battery cells 64. The tray has a front panel 66, a rear panel 67 (FIG. 4), a right side panel 68, and a left side panel 69 that form a wall extending upward from the perimeter of the bottom panel. A support 72 having a pair of axles 73 and 74 that project outwardly therefrom is welded to the right side panel 68 and a similar support 75 having axles 76 and 77 that project outwardly therefrom is welded to the left side panel 69. A wheel 26 is rotatably mounted upon each axle and is held in place thereon by a flat washer 78 and a cotter pin 79, as shown in FIGS. 6 and 7.

A stop 81, shown in FIGS. 4 and 5, is welded to the rear panel 67 of the tray 24 and to the support 72 in a position to project downwardly therefrom and engage the stop 47 on the mounting base 34, thereby limiting movement of the tray outwardly from the battery compartment 12 onto the support surface 14. A similar stop 82 is welded to the tray and to support 75 in a position to engage the stop 48 on the mounting base. A pair of guides 84 and 85, formed by angles, are welded to the tray bottom panel 55 and extend downwardly on opposite sides of the guide 50 to restrain the tray from moving laterally of the direction of movement between the compartment 12 and the support surface 14.

Sleeves 87 and 88 are welded to the tray front panel 66 with the central axes of the sleeves aligned vertically. Slidably fitted within the sleeve 87 is the handle 27 and the handle 28 is slidably fitted in the sleeve 88. Since the handles 27 and 28 are similar, only handle 28 will be described in detail but it will be understood that the handle 27 has a corresponding structure. The handle 28 has a grip portion 90 extending outward horizontally above the sleeve 88 and downward vertically at a distance offset from the sleeve by the horizontally projecting portion. A lock portion 92 of the handle projects downward vertically from the grip portion through the sleeve to a position therebelow. The lowermost end of the lock portion fits within the hole 54 in the guide 50, as shown in FIG. 7, and the guide serves as a keeper for the handle.

A pin 93 extends horizontally through the lock portion 92 of the handle 28 and projects outwardly therefrom on each side thereof in a vertical plane perpendicular to the horizontally extending grip portion 90. The pin is positioned to extend under the bottom panel 55 of the tray 24 when the grip portion of the handle extends adjacent the tray, thereby preventing the lock portion 92 of the handle from being elevated out of the hole 54 in the keeper or guide 50 without rotating the handle to where the grip portion extends outwardly from the tray. A flat washer 94 is welded to the lock portion of the handle above the sleeve 88 to form an outwardly extending radial flange and a compression spring 95 is positioned around the lock portion of the handle between the radial flange and the top of the sleeve to urge the handle upward. This spring must be compressed before locking the tray 24 in a stationary position on the mounting base 30.

When the handle 28 is rotated to an unlocked position but the locking portion 92 is still within the hole 54, the spring 95 will elevate the handle to a level where the pin 93 contacts the underside of the sleeve 88 and is positioned opposite the front panel 66 of the tray 24. The outwardly projecting ends of the pin limit rotational movement of the handle, as indicated by the solid line and phantom line positions of handle 27 in FIG. 4, to maintain the grip portion of the handle in a position extending outwardly from the tray. When the grip portion of either handle 27 or 28 extends outwardly from the tray 24, the door 20 to the battery storage compartment 12 cannot be closed. When the grip portion of the handle is positioned adjacent the tray and the door to the battery storage compartment is closed, the lock portion 92 of the handle 28 cannot be removed from the hole 54 in the keeper or guide 50.

The battery holder 22 is assembled by positioning the support tray 24 upon the mounting base 30 with the tray stops 81 and 82 located between the back panel 32 and the base stops 47 and 48. The wheel retainers 38 and 46 are then fitted about the stud bolts 37 and 36, respectively, and secured in place by the stop nuts 40. The support tray can be readily removed from the mounting base by removing the stop nuts and wheel retainers. The battery holder can be inserted into the battery storage compartment 12 and the mounting base can be fastened therein by bolts, not shown.

The battery cells 64 are placed upon the support tray 24 and are held in place by the hold-down frame 62 that is coupled with the tray by connecting bolts 60. The battery cells are connected by appropriate cables to the electrical circuitry of the motor vehicle 10. Sufficient slack is provided in these cables to permit the support tray to move freely from the battery storage compartment 12 to a position on the adjacent support surface 14 where the battery cells can be inspected and serviced.

During normal operation, the battery cells 64 are mounted on the battery holder 22 and both the battery cells and holder are housed within the battery storage compartment 12. When it is necessary to inspect or service the battery cells, the latch 21 is unlocked and the door 20 is opened. The handles 27 and 28 are rotated about ninety degrees to where the grip portions 90 extend outwardly from the battery cell support tray 24. The compression springs 95 elevate the handles to disengage the lock portions 92 from the guide or keeper 50 and by pulling outward on the handles, the support tray will roll onto the adjacent support surface 14. After inspection and servicing of the battery cells, the support tray is pushed by the handles back into the storage compartment. The handles are then pushed downward with the lock portions thereof fitting into the holes 52 and 54 in the guide or keeper 50. The grip portions of the handles are rotated about 90° to extend adjacent the support tray and the door 20 is locked in a closed position.

An efficient utilization of space on the motor vehicle 10 is achieved by the battery support tray 24 being mounted on wheels 26 for movement between a battery storage position in the compartment 12 and a battery inspection position on the support surface 14. The tray wheels 26, as shown in FIGS. 4 and 6, have a diameter and a width large enough to roll on top of the tread surface ridges 16 without dropping into the intermediate valleys 18. Thus, the tray can be moved with minimal frictional resistance and the tray wheels are not adversely affected by water, battery acids, dirt or other foreign material. Undesired movement of the tray is prevented by the stops 81, 82, 47 and 48, the guides 50, 84, and 85, and the locking handles 27 and 28. The door 20 is not affected by the load on the battery support tray, but as a safety feature cannot be closed unless the tray is properly locked within the compartment. This door, when in a closed position, prevents the tray from inadvertently becoming unlocked within the compartment.

Although the best mode contemplated for carrying out the present invention has been herein shown and described, it will be understood that modification and variation may be made without departing from what is regarded to be the subject matter of the invention.

What is claimed is:

1. In a motor vehicle having a battery storage compartment and a support surface located adjacent the compartment, an improved battery holder comprising a mounting base in said compartment, a battery cell support tray mounted on wheels for rolling between a position on the base where battery cells are housed and a position on the support surface where battery cells are serviced and inspected, and means for locking the tray in the position on the base to prevent undesired movement of the tray, said tray having a front panel and a bottom panel, said tray locking means including a vertical sleeve fixed to the front panel, a handle slidably fitted axially within the sleeve and pivotally supported therein for rotation through a horizontal angle, said handle having a grip portion extending outward horizontally above the sleeve and a lock portion projecting downward vertically below the sleeve, a pin extending horizontally from the lock portion of the handle in a vertical plane perpendicular to the grip portion, a keeper mounted on the base for receiving and retaining the lock portion of the handle, said pin extending under the bottom panel of the tray when the grip portion of the handle extends adjacent the tray and thereby preventing the lock portion of the handle from being elevated out of the keeper without rotating the handle to a position where the grip portion extends outwardly from the tray.

2. An improved battery holder as described in claim 1 wherein said tray locking means further includes a radial flange projecting outwardly from the handle above the sleeve, and a compression spring positioned around the handle between the radial flange and the top of the sleeve to urge the handle upward and to require compression before locking the tray.

3. An improved battery holder as described in claim 1 wherein said pin extends outwardly from each side of the lock portion of the handle whereby each end of the pin limits rotational movement of the handle in an elevated position by contact with the front panel to maintain the grip portion of the handle extending outwardly from the tray.

4. An improved battery holder as described in claim 3 which further includes wheel retainers mounted to the base and extending over the tray wheels to limit upward movement of the tray and thereby prevent accidental removal of the lock portion of the handle from the keeper.

5. An improved battery holder as described in claim 1 which further includes at least one stop projecting upward from the end of said mounting base adjacent the support surface, and at least one stop projecting downward from the end of said tray opposite from the support surface to engage the corresponding mounting base stop, thereby limiting movement of the tray outwardly from the battery compartment onto the support surface.

6. An improved battery holder as described in claim 5 which further includes means for restraining upward movement of the tray to maintain the tray stop at a level to engage the mounting base stop.

7. An improved battery holder as described in claim 1 which further includes a guide projecting upward from said mounting base and extending in a direction along the base corresponding with the direction of movement of the tray between the battery storage compartment and the support surface, and a pair of guides projecting downward from the tray on opposite sides of the base guide to restrain the tray from moving laterally of the direction of movement between the compartment and the support surface.

8. In a motor vehicle having a battery storage compartment, a support surface located adjacent the compartment, and a door separating the compartment from the support surface, an improved battery holder comprising a mounting base in said battery compartment, a battery cell support tray mounted on wheels for rolling between a position on the base where battery cells are housed and a position on the support surface where battery cells are serviced and inspected, and means for locking the tray in the position on the base to prevent undesired movement of the tray, said tray locking means including a handle that must be in a locked position before the door can be closed.

9. An improved battery holder as described in claim 8 wherein said handle has a horizontally extending grip portion that must be rotated to a position projecting outwardly from the tray to unlock the tray for movement from the position on the mounting base, said door in a closed position being located to limit rotational movement of the handle and thereby prevent the tray locking means from becoming unlocked.

10. In a motor vehicle having a battery storage compartment and a support surface located adjacent the compartment, said surface having ridges and intermediate valleys in a tread pattern to reduce slippage of persons stepping thereon, an improved battery holder comprising a mounting base in said battery compartment, a battery cell support tray mounted on wheels for rolling between a position on the base where the battery cells are housed and a position on the support surface where the battery cells are serviced and inspected, said tray having wheels of a diameter and a width large enough to roll on top of the surface ridges without dropping into the intermediate valleys, and means for locking the tray in the position on the base to prevent undesired movement of the tray.

11. In a motor vehicle having a battery storage compartment and a support surface located adjacent the compartment, an improved battery holder comprising a mounting base in said compartment, a battery cell support tray mounted on wheels for rolling between a position on the base where battery cells are housed and a position on the support surface where battery cells are serviced and inspected, a handle mounted upon the tray for pivotal movement in a horizontal plane and for slidable movement vertically along its pivotal axis, said handle having a grip portion extending outward horizontally from its pivotal axis adjacent the tray and a lock portion depending downward vertically below the tray, a pin extending horizontally from the lock portion of the handle in a vertical plane perpendicular to the grip portion, a keeper mounted on the base for receiving and retaining the lock portion of the handle to prevent undesired tray movement, said pin extending under the tray above the keeper when the grip portion of the handle extends adjacent the tray and thereby preventing the lock portion of the handle from being elevated out of the keeper without turning the handle to a position where the grip portion extends outwardly from the tray.

12. An improved battery holder as described in claim 11 wherein said tray locking means includes resilient means for urging the handle vertically along its pivotal axis, said resilient means requiring compression to move the handle downward for inserting the lock portion of the handle into the keeper.

* * * * *